US007187665B2

(12) United States Patent
Nakamura (10) Patent No.: US 7,187,665 B2
(45) Date of Patent: Mar. 6, 2007

(54) APPARATUS AND METHOD OF SCHEDULING CHANNEL ALLOCATION IN DYNAMIC TDMA FRAME

(75) Inventor: Mitsuyuki Nakamura, Tokyo (JP)

(73) Assignee: NEC Corporation, Tokyo (JP)

( * ) Notice: Subject to any disclaimer, the term of this patent is extended or adjusted under 35 U.S.C. 154(b) by 1036 days.

(21) Appl. No.: 10/200,483

(22) Filed: Jul. 23, 2002

(65) Prior Publication Data
US 2003/0026286 A1    Feb. 6, 2003

(30) Foreign Application Priority Data
Jul. 23, 2001   (JP)   ............... 2001-221185

(51) Int. Cl.
*H04J 3/02*   (2006.01)
(52) U.S. Cl. ..................... 370/329; 370/442
(58) Field of Classification Search ............... 370/329, 370/341, 437, 442
See application file for complete search history.

(56) References Cited

U.S. PATENT DOCUMENTS

| 4,236,227 A | 11/1980 | Bull et al. |
| 5,299,199 A | 3/1994 | Wilson et al. |
| 5,535,207 A | 7/1996 | Dupont |
| 5,594,738 A | 1/1997 | Crisler et al. |
| 6,097,707 A | 8/2000 | Hodzic et al. |
| 6,208,661 B1 * | 3/2001 | Marshall ..................... 370/412 |

FOREIGN PATENT DOCUMENTS

| JP | H03-255522 A | 11/1991 |
| JP | 2000-209631 A | 7/2000 |
| JP | 2001-53711 A | 2/2001 |
| JP | 2001-111510 A | 4/2001 |
| JP | 2001-111571 A | 4/2001 |
| JP | 2001-126491 A | 5/2001 |
| JP | 2001-156733 A | 6/2001 |
| JP | 2003-228990 A | 8/2003 |
| KR | 1998-079701 A | 11/1998 |

* cited by examiner

*Primary Examiner*—Melvin Marcelo
(74) *Attorney, Agent, or Firm*—Sughrue Mion, PLLC (57) ABSTRACT

When channel allocation is scheduled in a dynamic TDMA frame for communications with a plurality of terminals and then the scheduling results are reflected in a frame table, a shift register is used as the frame table. The shift register comprises a plurality of register units coupled in tandem. Each of the register units is allocable to a channel for one of the plurality of terminals. A shift controller is coupled to the shift register, and controls the shift register such as to write a new channel defining data at a given register unit and collectively shift a plurality of channel defining data respectively stored in a plurality of register units so as to make space for said new channel defining data at said given shift register.

11 Claims, 9 Drawing Sheets

APPARATUS AND METHOD OF SCHEDULING CHANNEL ALLOCATION IN DYNAMIC TDMA FRAME

BACKGROUND OF THE INVENTION

1. Field of the Invention

The present invention relates generally to a data communications system using TDMA (Time Division Multiple Access) frames, and more specifically to techniques of scheduling channel allocation in the dynamic TDMA frame.

2. Description of Related Art

As is well known in the art, TDMA allows each user to access the full spectrum allocation for a fraction of the time. TDMA is a technique in which the available spectrum resource is occupied by one modulated carrier, and each of the whole "n" channels gains access to that carrier for 1/n of the time in an ordered sequence. However, such a fixed channel TDMA technique has proven unable to meet the situation where the data rate required varies every moment and the user demands a high date rate in the broadband communications. In order to solve the problems with the fixed channel TDMA technique, dynamic TDMA has been proposed which dynamically assigns the channels in the TDMA frame. With the dynamic TDMA, it is possible to obviate the difficulties inherent in the fixed channel TDMA. By way of example, the dynamic TDMA technique is adopted in HIPERLAN/2 (High PERformance LAN type 2) that is an European standard specified by ETSI (European Telecommunications Standards Institute) protect BRAN (Broadband Radio Access Networks) in 5 GHz frequency band.

Figure 1:
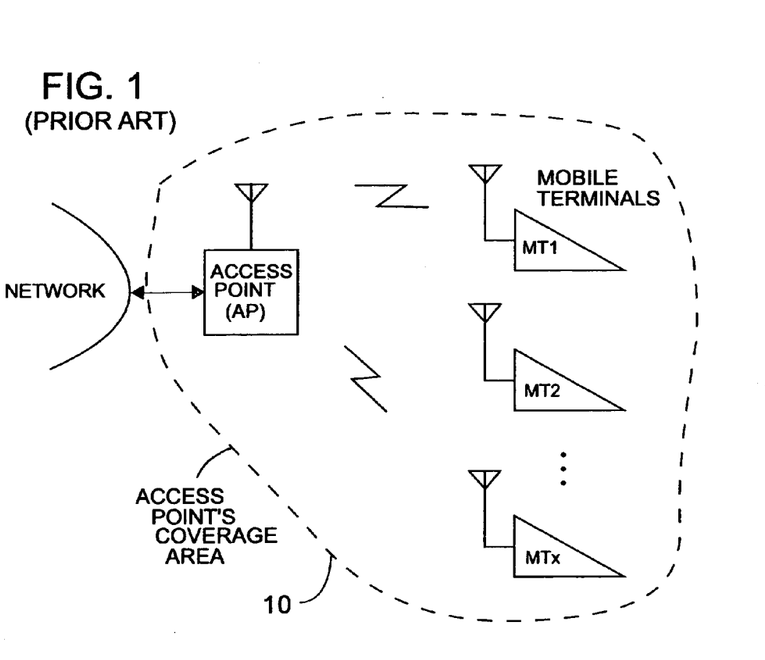
FIG. 1 is a sketch schematically showing a plurality of mobile terminals located in a service area of an access point AP, having referred to in the opening paragraphs.

Before turning to the present invention, it is advantageous to briefly describe, with reference to FIGS. 1–5, the background of the present invention, FIG. 1 is a sketch which schematically shows one example of a short-range high-speed radio access system provided in indoor or outdoor environments. An access point AP serves as a base station and a bridge between a wireless network and a larger Ethernet network, the Internet, etc. A plurality of mobile terminals (denoted by MT1 to MTx), which are located in a service area 10 of the access point AT, are able to establish bidirectional radio links (uplink and downlink) with the access point AP and/or with each other via the access point AP.

Figure 2:
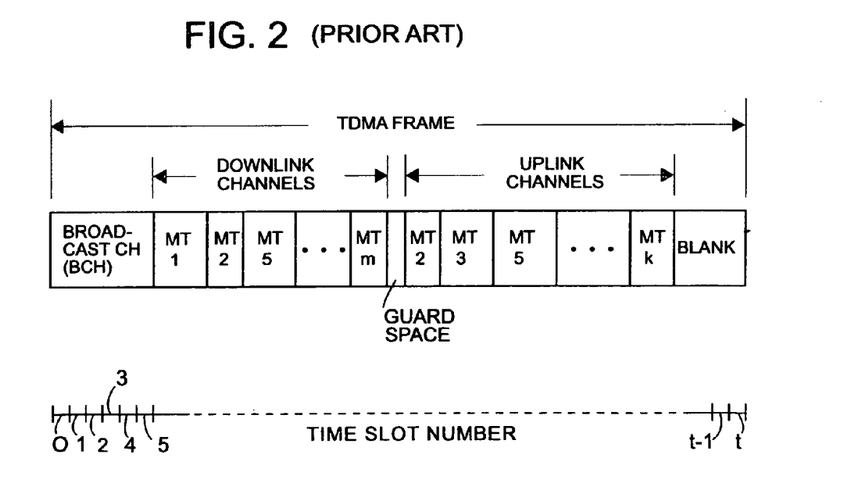
FIG. 2 is a diagram showing one TDMA frame structure, having been referred to in the opening paragraphs.

FIG. 2 schematically shows one TDMA frame wherein a plurality of channels are dynamically allocated so as to realize an effective use of the limited capacity in the TDMA frame. Although many kinds of channels are defined in the HIPERLAN/2, only three channels are referred to in the instant disclosure for the sake of simplifying the description. That is to say, as shown in FIG. 2, the TDMA frame generally comprises a broadcast channel BCH, downlink channels, and uplink channels. A guard space is typically provided between the downlink and uplink channels. When generating each TDMA frame, if no further channel generation becomes unnecessary, the remaining time space in the frame is blanked. Each channel consists of a plurality of time slots that are numbered as shown in FIG. 2, and thus, each channel can be defined by specifying the time slots at start and end positions of the channel.

The broadcast channel BCH, which may be called a frame header, is used to advise the mobile terminals MTs of the TDMA frame structure in order to enable the communications between the access point AP and the mobile terminals MTs. More specifically, the broadcast channel BCH indicates the frame's front position so as to establish frame synchronization at each of the mobile terminals MTs. Further, the BCH is used to advise each mobile terminal MT of the length of the data (downlink and/or uplink), and further to inform each MT where the data is located in the frame using the time slot numbers at the start and end of the data. To this end, the broadcast channel BCH includes the following pieces of information with respect to each packet: the MT number (viz., MT identification (ID)), the kind of channel to be used (viz., user channel or control channel), the distinction between the downlink and the uplink via which the packet is conveyed, the start position (viz., starting time slot number) of the packet in the frame, and the packet data length. Thus, the broadcast channel BCH serves to define the frame structure in order that the access point AT is able to communicate with the mobile terminals MTs using the dynamically allocated channels.

In the dynamic TDMA, in the case where there exist two or more channels directed to the same mobile terminal MT in the downlink channels and/or the uplink channels, these channels are respectively neighbored in the downlink channels and/or the uplink channels so as to reduce overheads which otherwise are required for each channel. As one simple example, if the access point AP receives a large amount of data from the network, which is directed to a certain mobile terminal, the access point AP assigns all the channels of the frame to the same mobile terminal MT so as to transmit the data at a high rate to the mobile terminal. The dynamic channel (viz., time slot) allocation in the frame is referred to "scheduling" that is carried out at a scheduler, which will be described in more detail with reference to FIGS. 3 and 4.

Figure 3:
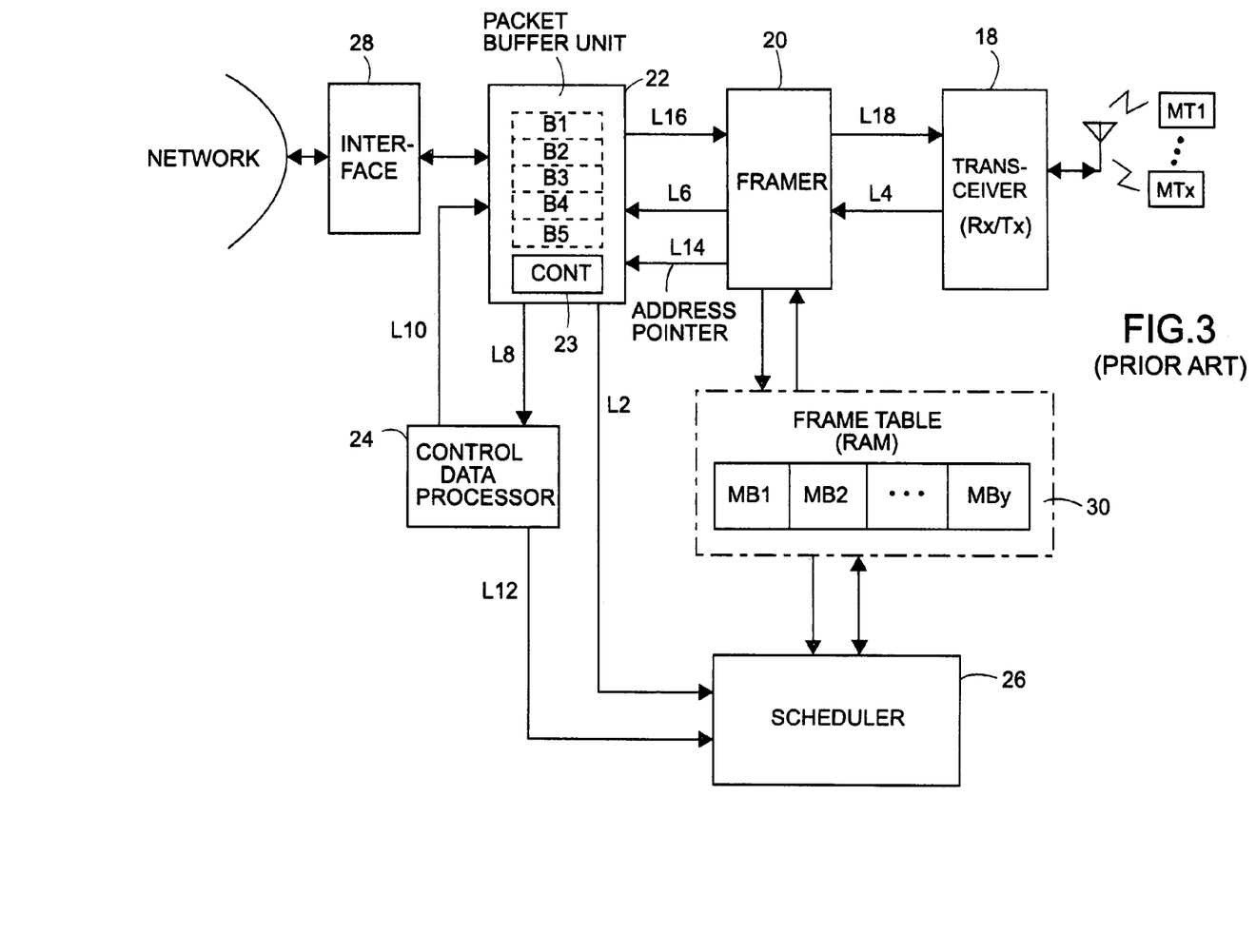
FIG. 3 is a diagram schematically showing an arrangement of the conventional access point AP, having been referred to in the opening paragraphs.

Referring to FIG. 3, the hardware arrangement of the access point AT is schematically shown in block diagram form. As shown, the access point AT generally comprises a transceiver (Rx/Tx) 18, a framer 20, a packet buffer unit 22, a control data processor 24, a scheduler 26, an interface 28 provided between the access point AP and the network, and a frame table 30, all of which are functionally coupled as illustrated. The present invention is particularly concerned with the scheduler 26 and the frame table 30, and as such, the remaining blocks are briefly described.

In order to simplify the description of the instant disclosure, it is assumed that the wireless communications have already been established between the access point AP and some of the mobile terminals MTs located in the service area 10 (FIG. 1). When the access point AP receives the user data (packet(s)) from the network via the interface 28, the user data are successively stored in a buffer B1 of the packet buffer unit 22 in the order of arrival under the control of a controller 23 provided in the unit 22. The controller 23 is used to control the data read/write operations with respect to the buffers provided in the packet buffer unit 22.

In the instant specification, the data to be transmitted from the access point AP to the mobile terminals MTs may be referred to as downlink data, while the data received at AP from the mobile terminals MTs may be referred to as uplink data.

The information required for scheduling with respect to each user data (packet) stored in the buffer B1 is applied to the scheduler 26 via a line L2. The information applied to the scheduler 26 includes the address pointer indicating the first address of the packet stored in the buffer B1, the mobile terminal ID to which the packet is to be transmitted, a kind of channel (user data channel in this case) to be generated for the packet, the number of time slots (viz., data length) to be allocated to the packet in the frame.

On the other hand, the control data, which are transmitted from the mobile terminals MTs to the access point AP, are successively applied to a buffer B2 of the packet buffer unit 22 via lines L4 and L6. The control data stored in the buffer B2 are successively applied, via a line L8, to the control data processor 24 to be analyzed thereat. That is to say, the control data processor 24 determines the data rate (viz., the number of time slots used in the frame) which the mobile terminal MT requires, the number of control data which the mobile terminal further wishes to transmit to the access point AP, etc. The control data to be transmitted to the mobile terminal MT are applied, via a line L10, to a buffer B3 of the packet buffer unit 22 and then stored therein.

Further, the control data processor 24 supplies, via a line L12, the scheduler 26 with the information needed for scheduling with respect to the control data and/or user data channels. That is to say, in the case of the control data, the control data processor 24 supplies the scheduler 26 with the address pointer indicating the first address of the control data stored in the buffer B3, the mobile terminal ID to which the control data is transmitted, a kind of channel (control data channel in this case) to be generated, the number of time slots (data length) to be allocated to the control channel in the frame for the mobile terminal specified above. On the other hand, in the case of user data to be transmitted to the access point AP, the control data processor 24 supplies the scheduler 28 with the mobile terminal ID from which the user data is to be transmitted, the address pointer of a buffer 4 into which the transmitted user data is stored, a kind of channel (user data channel in this case) to be generated, the number of time slots (data length) to be allocated to the user data channel in the frame for the mobile terminal specified above.

In addition, the scheduler 26 receives the information needed to transmit data over the broadcast channel BCH, which broadcasting data is stored in a buffer B5 of the packet buffer unit 22. The data to be transmitted using the broadcast channel BGH have been described above.

The scheduler 26 is supplied with the above-mentioned information for frame scheduling, and determines each structure of the TDMA frames that are repeatedly transmitted to the mobile terminals MTs at predetermined time intervals. In brief, the scheduler 26 determines, with respect to each mobile terminal related to the frame, the kind of channel (control data or user data channel), the number of channels, the channel location in the frame, etc. The frame structure determined by the scheduler 26 is reflected on the frame table 30 which takes the form of an random access memory (RAM) functionally divided into a plurality of memory blocks MB1–MBy. The memory block MB1 is dedicated to the broadband channel, and the remaining blocks MB2–MBy are assigned to the channels for the control data and/or the user data.

The scheduling is carried out considering preference of data to be transmitted and received. Although the data are in practice classified into more than two different preference groups, it is assumed for the sake of simplicity that the control data is given a higher priority relative to the user data. Therefore, the scheduler 26 assigns the control data in preference of the user data in the frame, and if the frame table 30 affords to accept the user data, then the scheduler 26 writes the user channel defining data into the available memory blocks. It is not seldom that all the memory blocks MB2–MBy are assigned to the control channel defining data except for the memory block MB1 dedicated to the broadband channel BCH.

The scheduler 26 initially selects the leading memory block MB1 and writes thereinto the following channel defining data: the channel information indicating that the channel assigned to MB1 is the BCH; the number of time slots (which is typically fixed) allocated to the BCH, the address pointer specifying the location of the BCH data stored in the buffer 5 of the packet buffer unit 22, etc. Following this, the scheduler 26 successively selects the subsequent memory blocks MB2, MB3, . . . , and write thereinto the control channel defining data for use in generating the downlink control channels at the framer 20. Further, the scheduler 26 selects a memory block which is preceded by the last memory block for the control channel, and assigns the same as the guard space. Thereafter, the scheduler 26 implements the similar operations as mentioned above with respect to the memory blocks to be assigned to the uplink control channels, in the case where one or more memory blocks are left after all the control channel defining data are written into the memory blocks, the scheduler 26 writes the user channel defining data into the memory blocks left over. Contrarily, if the scheduler 26 is unable to store all the control channel defining data currently handled into all the memory blocks MB1–MBy, the scheduler 26 waits until the memory blocks become available, and thereafter begins writing the remaining control channel defining data into the memory blocks from MB2 after writing the BCH channel defining data into MB1.

Figure 4:
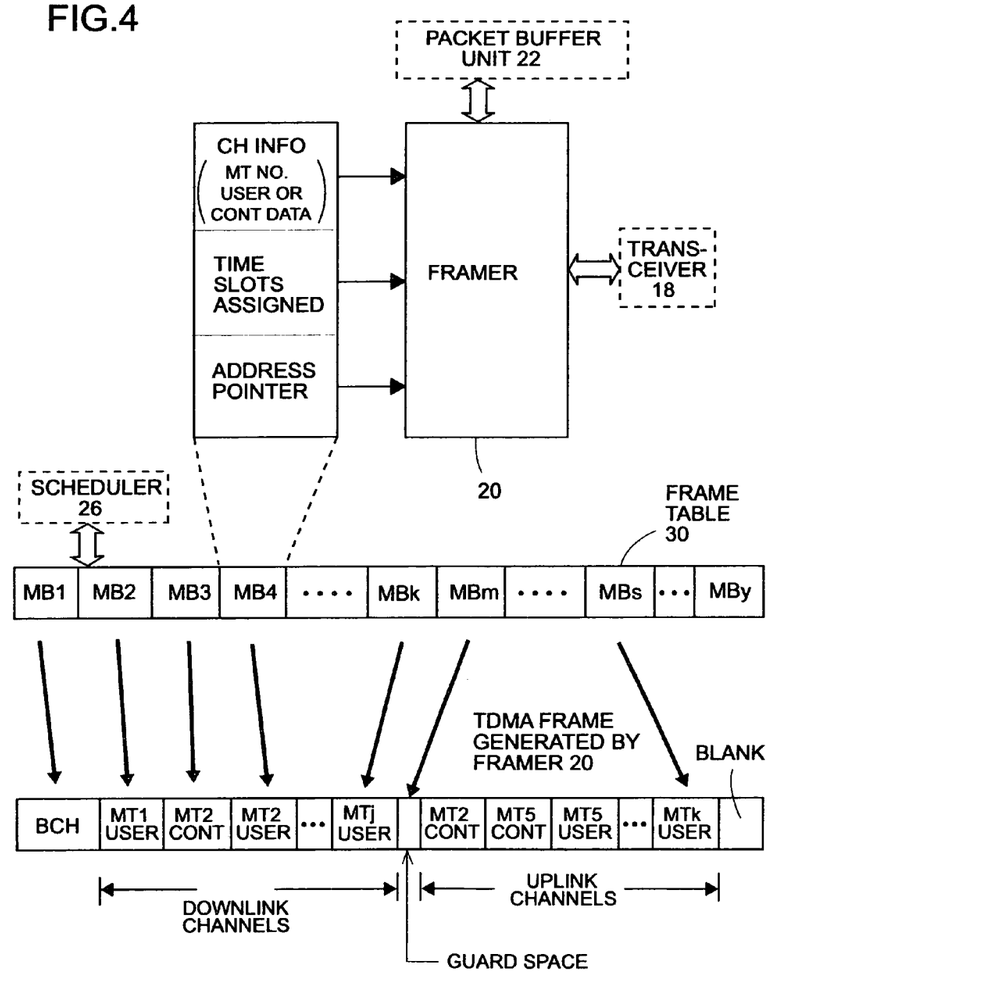
FIG. 4 is a diagram showing in detail a frame table shown in FIG. 3, one example of a TDMA frame to be transmitted to the mobile terminals such as shown in FIG. 1, and the blocks functionally coupled to the frame table, having referred to in the opening paragraphs.

Referring to FIG. 4, the frame table 30 will be described in more detail in connection with the operations of the scheduler 26 and the framer 20. As mentioned above, the contents of the frame table 30 reflect the result of the scheduling. The outline of the frame table 30 has already been described, and the descriptions given in the above may be omitted or simplified for brevity. The memory blocks MB1–MBy are accessed by the scheduler 26 and the framer 20 as well. The channel defining data stored in the memory block MB1 assigned to the BCH has been described. Each of the memory blocks MB2 to MBs in this particular case stores the channel information indicating the mobile terminal ID, a distinction between the control data and the user data, the number of time slots assigned to the mobile terminal, and the address pointer indicative of the first address of the buffer B1 or B3 or B4 in order that the framer 20 is able to retrieve the data related to the mobile terminal defined above.

The framer 20, in the first place, accesses the memory block MB1, and retrieves the address pointer therefrom which is applied to the packet buffer unit 22 via a line L14 and reads out the BCH data stored in the buffer 5 of the packet buffer unit 22 using the number of timing slots stored in the MB1. The data read out of the buffer 5 is applied to the framer 20 via a line L16 (FIG. 3). The detail of the data retrieval from the buffer 5 using the number of time slots is not given because the present invention is not concerned therewith. The framer 20 applies the data thus read out of the buffer 5 to the transceiver 18 via a line L18 (FIG. 3). It is assumed that only the memory blocks MB2–MBs are used and the remaining memory blocks are blanked. In a manner similar to the above, the framer 20 successively accesses MB2–MBs, and retrieves respectively the address pointers stored therein and reads out the data stored in the corresponding buffer in the packet buffer unit 22, after which the framer 20 applies the retrieved data to the transceiver 18.

In FIG. 4, one example of the TDMA frame outputted from the framer 20 is illustrated. The notation "USER" indicates the user data channel, while "CONT" the control data channel. The TDMA frame shown in FIG. 4 will be understood without difficulty from the descriptions so far given in the instant disclosure.

When the access point AP receives the data transmitted from a given mobile terminal using the TDMA frame such as shown in FIG. 4, the framer 20 accesses the corresponding MB and retrieves therefrom the information of the memory location of the buffers in the unit 22 into which the received data are to be stored. Thereafter, the framer 20 stores the received data in the predetermined memory area in the unit 22.

Returning to the scheduling which is implemented at the scheduler 26, when the scheduler 26 is going to write a certain new channel defining data into the frame table 30, if one or more channel defining data directed to the same mobile terminal MT have been stored in the memory block in the same link channel, the new channel defining data is stored into the memory block adjacent to the memory block already used for the same MT. In such a case, after the scheduler 26 determines the memory block into which the new channel defining data is to be written, the scheduler 26 stores the new channel defining data into the memory block. One known technique of writing the new channel defining data into the memory block, which neighbors the memory block already used to store the channel defining data for the same mobile terminal, will be described with reference to FIGS. 5(A) to 5(C).

Figure 5A:
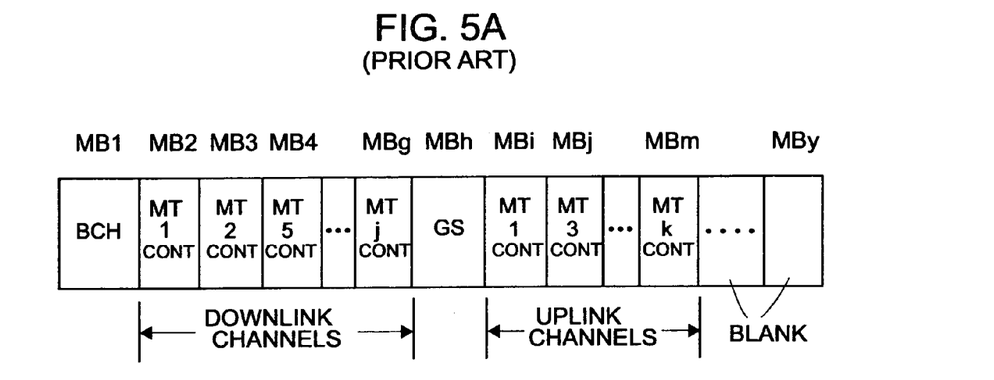
FIGS. 5A–5C are each showing a TDMA frame for describing a conventional technique for shifting the data stored in memory blocks of the frame table one by one, having been referred to in the opening paragraphs.
Figure 5B:
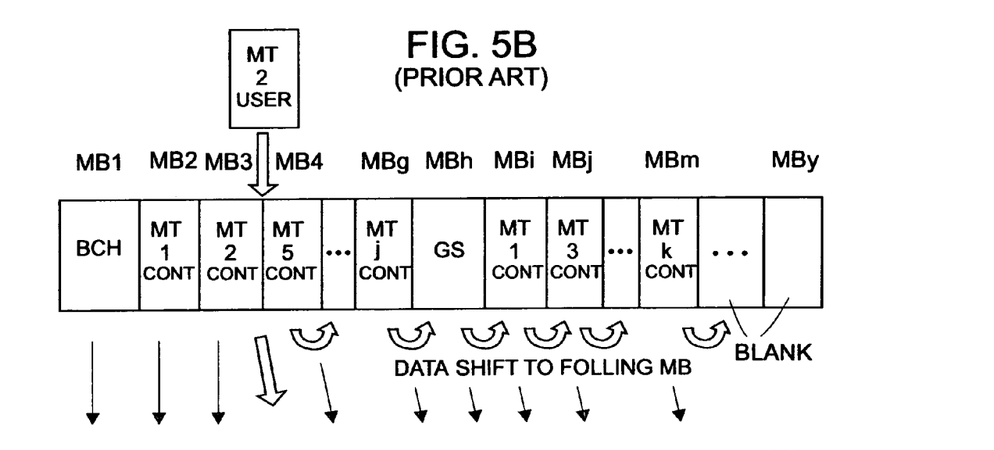
Figure 5C:
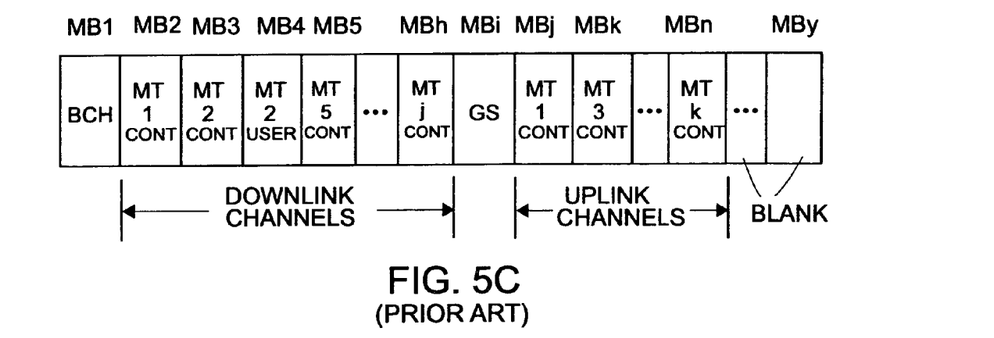

As shown in FIGS. 5A and 5B, it is assumed that the memory blocks MB1–MBm are used to store the channel defining data (FIG. 5A), and further assumed that a new channel defining data for the mobile terminal MT2 is to be written into the memory block MB4 (FIG. 5B). In this case, it is necessary to make space for the new channel defining data at MB4 by moving respectively the contents stored in MB4 to MBm to MB5 to MBn one by one. That is to say, the channel defining data shifting inevitably requires that the data stored in the last memory block MBm is first read out and then stored in the next one MBn, and then the data of the memory block MB(m-1) is read out and stored in MBm, and so on, and such operation is repeated until the data stored in MB4 is moved to MB5. It is understood that such data read/write operations at the memory blocks MB4–MBn suffers from undesirable consumption of a relatively large amount of time. Further, such a conventional technique has encountered the problem that it may occur that the scheduling can not be completed within the time duration assigned to one TDMA frame.

SUMMARY OF THE INVENTION

It is therefore an object of the present invention to provide a technique, via which the new channel defining data can be inserted into the frame table, and concurrently the channel defining data stored in a plurality of frame table's storage units can be moved collectively for making space for the new data.

Another object of the present invention is to provide a technique via which the storage unit in the frame table, into which the new channel defining data is to be written, can be determined in a very short time duration.

In brief, these objects are achieved by the techniques wherein when channel allocation is scheduled in a dynamic TDMA frame for communications with a plurality of terminals and then the scheduling results are reflected in a frame table, a shift register is used as the frame table. The shift register comprises a plurality of register units coupled in tandem. Each of the register units is allocable to a channel for one of the plurality of terminals. A shift controller is coupled to the shift register, and controls the shift register such as to write a new channel defining data at a given register unit and collectively shift a plurality of channel defining data respectively stored in a plurality of register units so as to make space for said new channel defining data at said given shift register.

One aspect of the present invention resides in a hardware arrangement for scheduling channel allocation in a dynamic TDMA frame for communications with a plurality of terminals and reflecting the scheduling results in a frame table, comprising: a shift register being used as the frame table, the shift register comprising a plurality of register units coupled in tandem, each of the register units being allocable to a channel for one of the plurality of terminals; and a shift controller being coupled to the shift register, the shift controller controlling the shift register such as to write a new channel defining data into a given register unit and collectively shift a plurality of channel defining data respectively stored in a plurality of register units so as to make space for the new channel defining data at the given register unit.

Another aspect of the present invention resides in a method of scheduling channel allocation in a dynamic TDMA frame for communications with a plurality of terminals and reflecting the scheduling results in a frame table, comprising the steps of: determining a given register unit among a plurality of register units which are coupled in tandem and are used as the frame table, each of the plurality of register units being allocable to a channel for one of the plurality of terminals; and writing a new channel defining data into the given register unit and collectively shifting a plurality of channel defining data respectively stored in a plurality of register units so as to make space for the new channel defining data at the given register unit.

THE DRAWINGS

The features and advantages of the present invention will become more clearly appreciated from the following description taken in conjunction with the accompanying drawings in which like elements or portions are denoted by like reference numerals and in which.

DETAILED DESCRIPTION OF THE PREFERRED EMBODIMENTS

A first embodiment of the present invention will be described with reference to FIGS. 6 to 9C.

Figure 6:
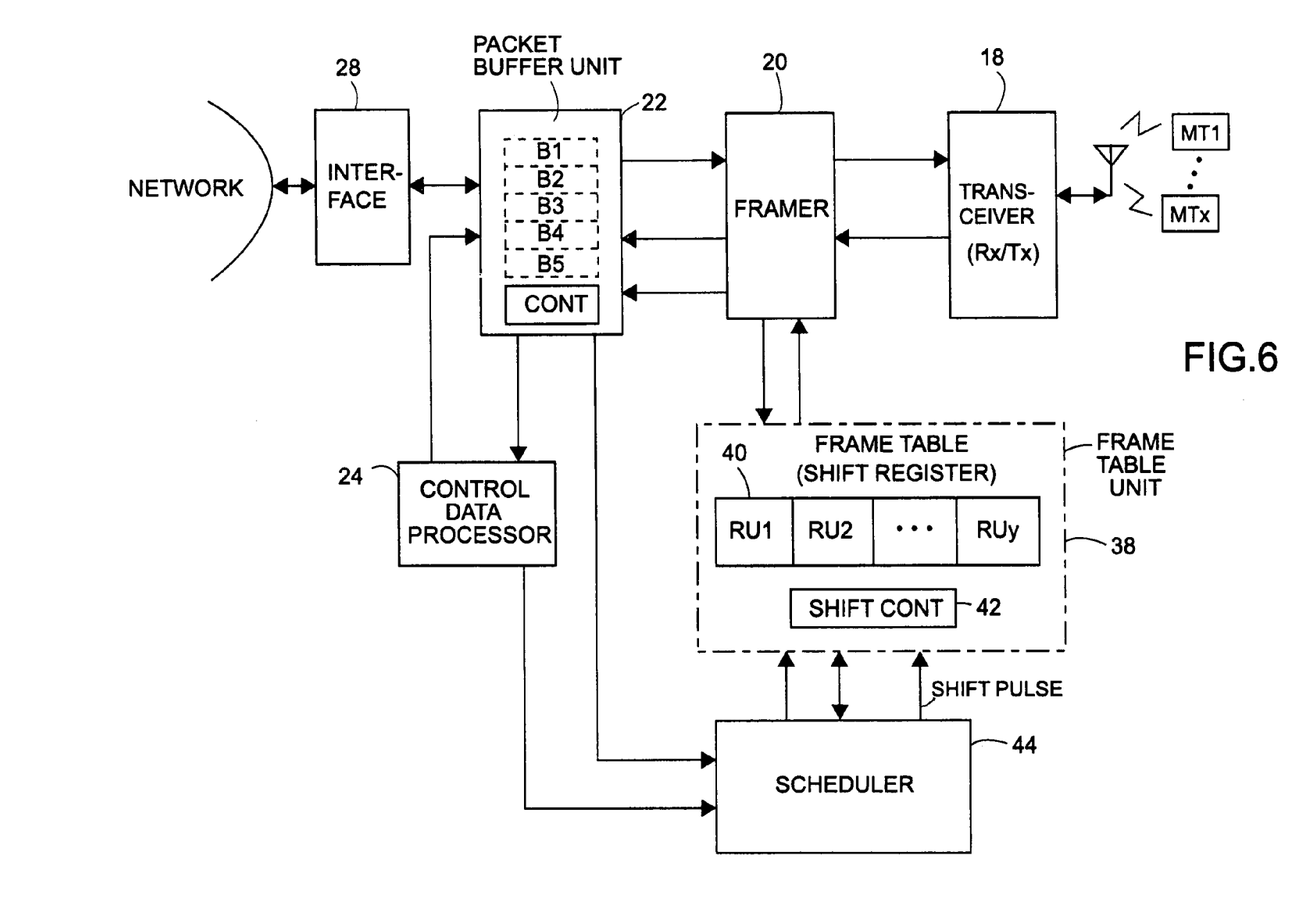
FIG. 6 is a diagram schematically showing an arrangement of an access point AP according to the first embodiment of the present invention.

FIG. 6 is a diagram schematically showing an arrangement of an access point AP, such as illustrated in FIG. 1, in accordance with the first embodiment. As shown in FIG. 6, a frame table unit 38 comprises a shift register 40 used as a frame table, and a shift controller 42, while a scheduler 44 is arranged to issue a shift pulse. Other than this, the arrangement and operations of the access point AP of FIG. 6 is substantially identical with those of FIG. 3, and as such, the descriptions already made with reference to FIG. 3 will be omitted for the sake of simplifying the instant disclosure. The shift register 40 comprises a plurality of register units RU1 to RUy whose data shift is controlled by the shift controller 42 as will be described later.

Figure 7:
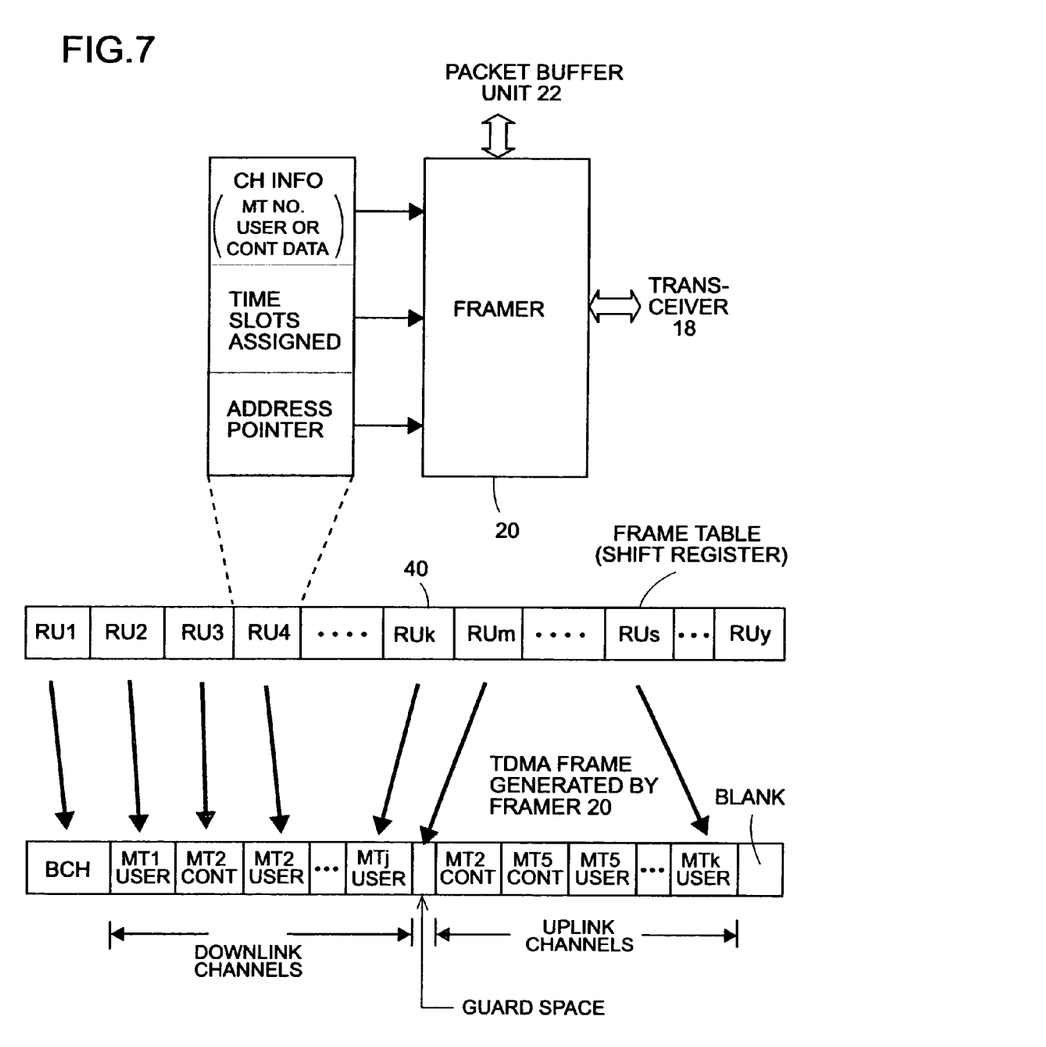
FIG. 7 is a diagram showing in detail a frame table shown in FIG. 6, one example of a TDMA frame to be transmitted to the mobile terminals such as shown in FIG. 1, and the blocks functionally coupled to the frame table.

FIG. 7 is substantial Identical to FIG. 4 except that the memory blocks MB1–MBy of FIG. 4 is replaced by the register units RU1–RUy, and hence further descriptions of FIG. 7 is deemed redundant, and accordingly, will be omitted for simplifying the disclosure.

Figure 8:
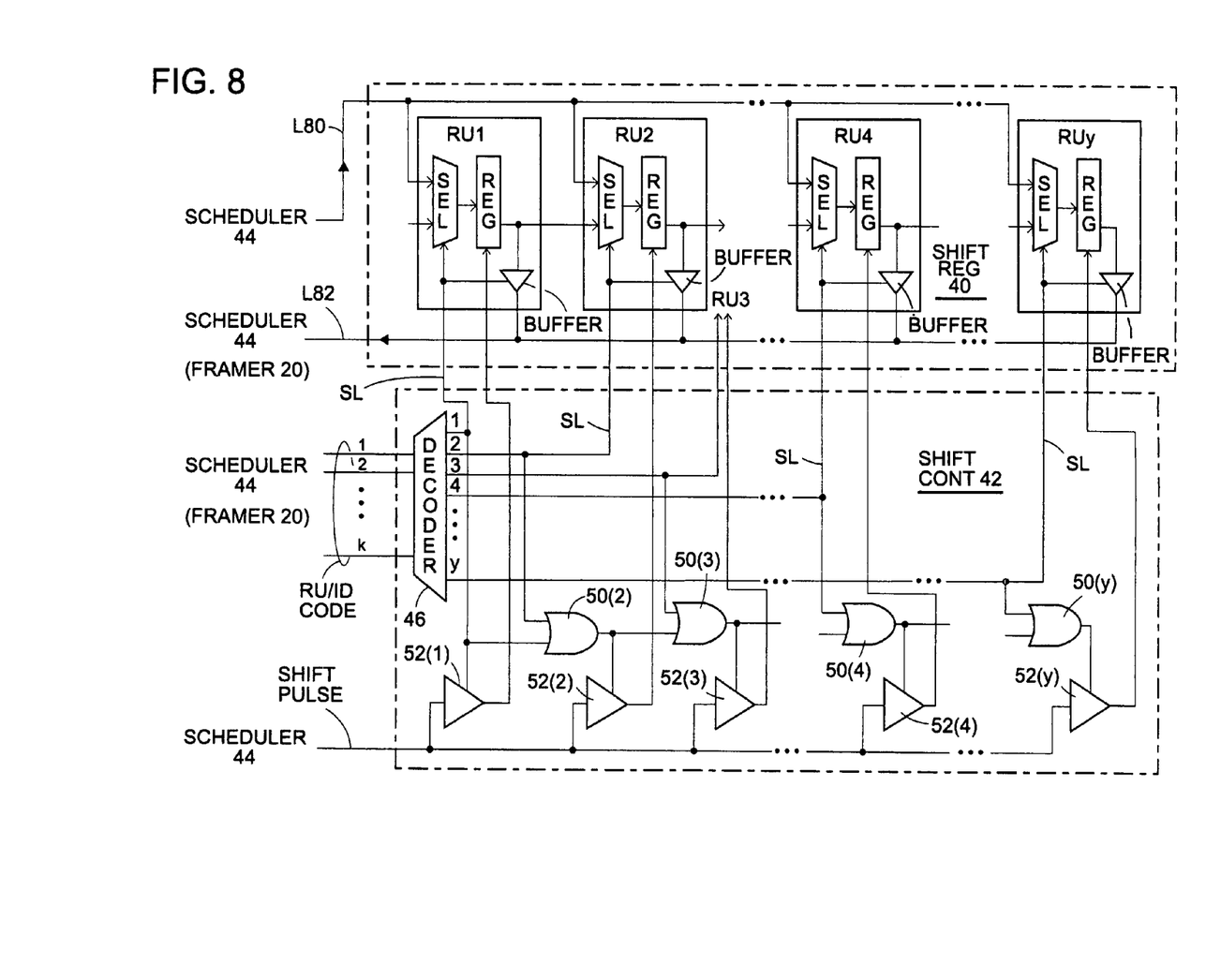
FIG. 8 is a block diagram showing in detail the frame table and a shift controller both shown in FIG. 6.

FIG. 8 is a block diagram showing the frame table unit 38 in detail. As shown, the shift register 40 comprises a plurality of register units RU1 to RUy each of which comprises a selector SEL, a register REG, and a buffer with an enable terminal. The selector SEL, in response to a high logic level H (for example) applied thereto, selects the data appearing on a line L80 extending from the scheduler 44, and otherwise (viz., in the case of a low logic level L) operates such as to select the data stored in the register REG in the preceding register unit. The buffer in each of the register units RU1 to RUy, in response to a high logic level H, allows the data stored in the corresponding register REG, to pass therethrough. The data thus derived is applied to the scheduler 44 by way of a data output line L82. The shift controller 42 comprises a decoder 46, OR gates denoted by 50(2) to 50(y), and buffers denoted by 52(1) to 52(y), all of which are coupled as illustrated.

As mentioned above, before the scheduler 44 determines whether a new channel defining data assigned to a given mobile terminal MT is to be inserted such as to neighbor the register unit RU already allocated to the same mobile terminal as the given mobile terminal, it is necessary to examine all the data stored in the register units RU1 to RUy. To this end, the scheduler 44 successively applies register unit ID codes (each k-bit (for example)) to the decoder 46 so as to respectively ascertain the data in the register units RU1 to RUy. More specifically, the scheduler 44 initially supplies the decoder 46 with a register unit ID code specifying the register unit RU1, in response to which the decoder 46 issues a high logic level H only at the output 1 thereof. The high level H is applied to the selector SEL of the register unit 1. During the data examining operation currently implemented, no shift pulse is applied to the shift controller 42 and thus the register REG of the register unit RU1 does not acquire the output of the selector SEL. This implies that the data stored in the register REG of the unit RU1 remains unchanged and appears on the data output line L82, and then applied to the scheduler 44. Subsequently, the data stored in the registers REGs of the units RU2–RUy are successively read out and applied to the scheduler 42.

The scheduler 42 checks to determine, using the data applied thereto from the shift register 40 by way of the output line L82, whether the mobile terminal related to the new channel defining data has been assigned in the frame table (viz., shift register) 40 with respect to the same link connection. In the case where the check result is affirmative, the new channel defining data is written into the shift register 40 such as to neighbor the register unit assigned to the same mobile terminal, the operation of which will be described with reference to FIGS. 8 and 9A–9C.

Figure 9A:
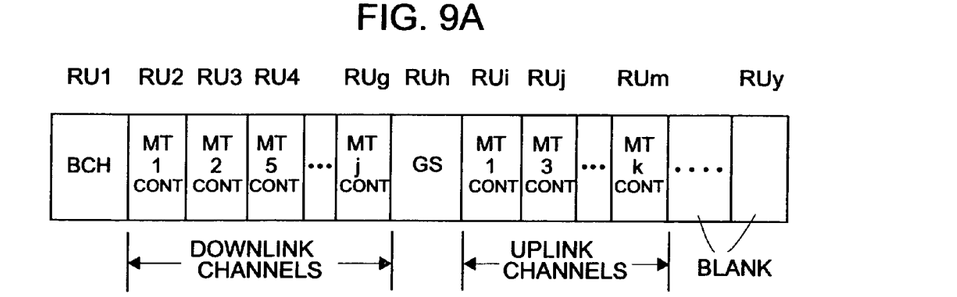
FIGS. 9A–9C are each showing a TDMA frame for further describing the first embodiment of the present invention.

FIG. 9A shows one example of the contents of the register units RU2 to RUy of the frame table 40. It is assumed that the register units RU2 to RUy have respectively been assigned to the control data of a plurality of mobile terminals, and assumed that the new channel defining data to be inserted into the frame table 40 is allocated to the mobile terminal MT2. It is further assumed that the new channel defining data is related to the downlink data. Thus, the new channel defining data of the mobile terminal MT2 is to be written into the register unit RU4. On the above assumptions, the scheduler 44 issues the new channel defining data of the mobile terminal MT2 on the input line L80, and applies the register unit ID code to the decoder 46 which, in response to the ID code, issues a high logic level H at the output 4 thereof and low logic levels Ls at the remaining outputs. The high logic level H is applied to the OR gate 50(4) whose output takes a high logic level H.

It is understood that the high logic level H, which appears at the output of the OR gate 50(4), allows each of the following OR gates 50(5)–50(y) to issue a high logic level H, and also understood that each of the outputs of the OR gates 50(2)–50(3) preceding the OR gate 50(4) remain unchanged (viz., continue to generate low logic levels Ls). Accordingly, the buffers 52(4)–52(y) are respectively enabled by high logic levels Hs applied to the corresponding enable terminal, while the buffers 52(1)–52(3) remain unable due to low logic levels Ls applied to the enable terminals thereof.

Figure 9B:
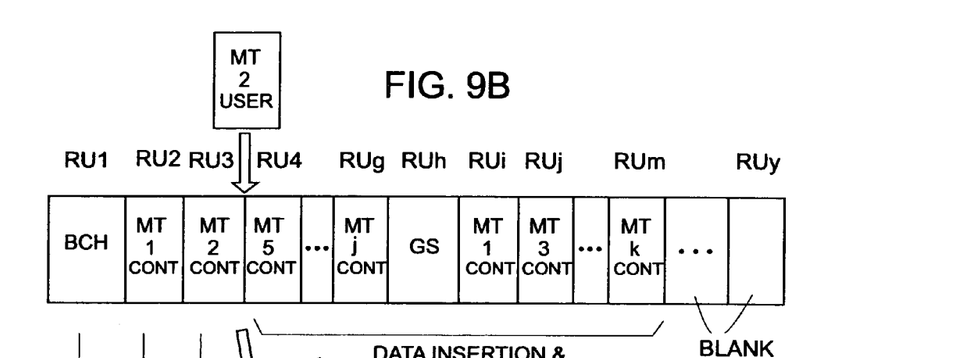
Figure 9C:
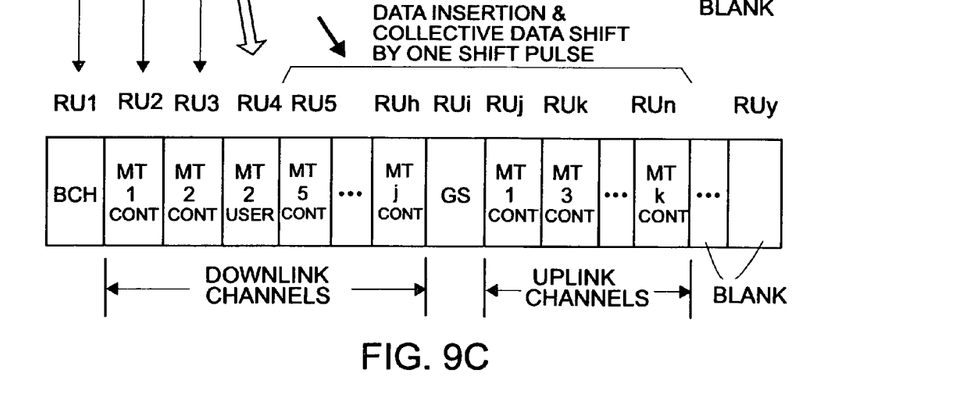

Under these conditions, the scheduler 44 applies the new channel defining data of the mobile terminal MT2 to the shift register (frame table) 40 on the data input line L80, and also applies a single shift pulse to the buffers 52(1)–52(y). Therefore, the register REG of RU4, in response to the shift pulse, acquires the new channel defining data of the mobile terminal MT2 by way of the selector SEL of RU4 in that the decoder 46 issues a high logic level H at the output 4 thereof. In addition, a selector signal SL taking a high logic level H is applied to the selectors SELs of the register units RU5–RUy, and thus, each of the selectors SELs of the RU5–RUn selects the data stored in the preceding register unit RU. As a result, when a single shift pulse is applied to the shift controller 42, the data of the mobile terminal MT2 is written into RU4, and concurrently, the data stored in the succeeding RU4–RUm are shifted to RU5–RUn, respectively. These operations of data insertion and the collective data shift to the right by one are schematically shown in FIGS. 9B and 9C.

In the case where the scheduler 44 determines that no data has been assigned to the mobile terminal MT to which the new channel defining data is going to be assigned in the frame table 40, then the scheduler 44 inserts the new channel defining data into the register unit RU which follows the last RU already used to store data in the frame table 40. Contrarily, in the case that the scheduler 44 finds, in the frame table 40, two or more data each of which has been assigned to the mobile terminal MT to which the new channel defining data is assigned, the scheduler 44 inserts the new data into the register unit RU which follows the last RU already assigned to the same mobile terminal. In this instance, it is not difficult to operate the scheduler 44 so as to specify the last register unit RU already assigned to the same mobile terminal.

Figure 10:
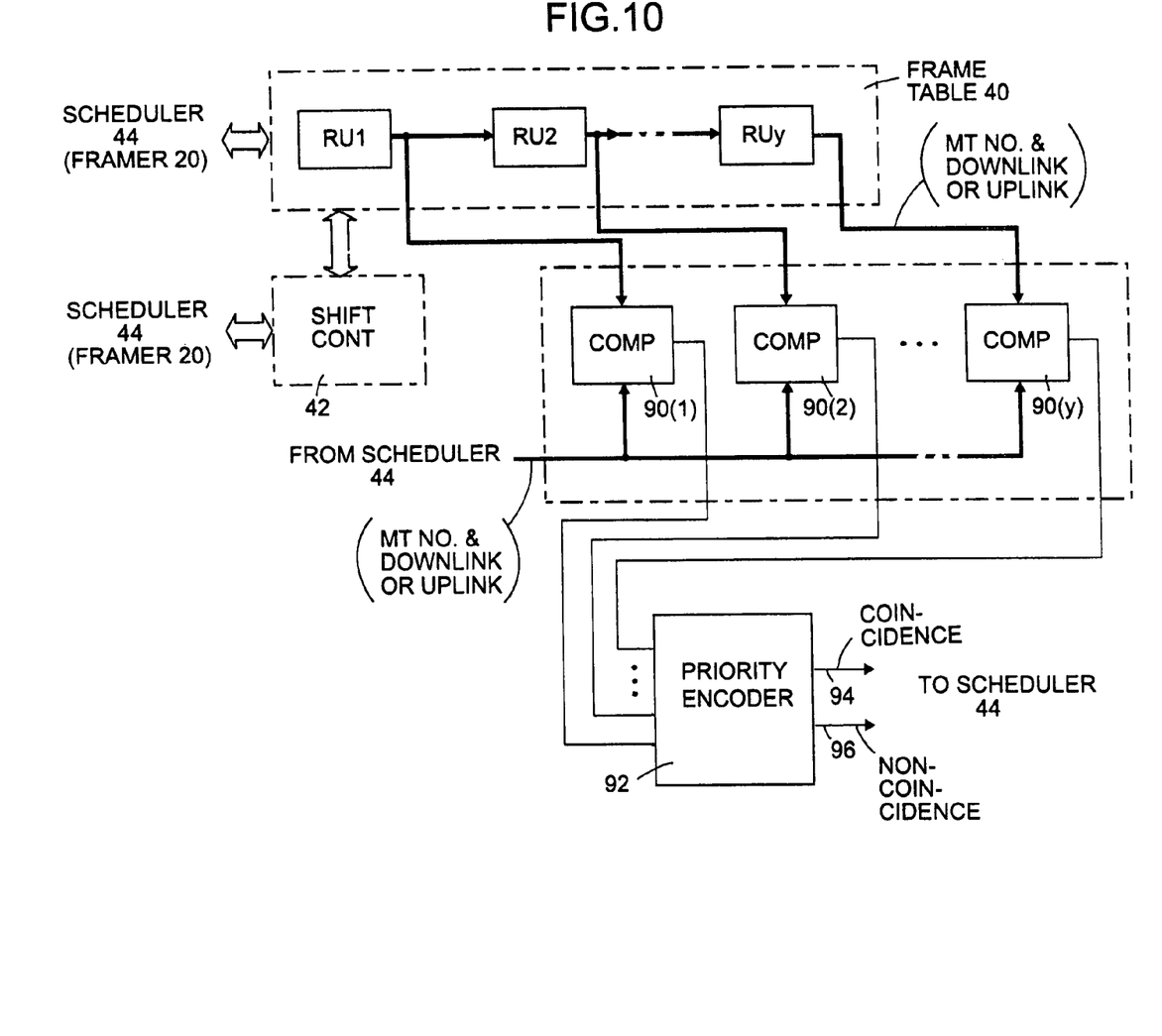
FIG. 10 is a diagram schematically showing a second embodiment of the present invention.

A second embodiment of the present invention will be described with reference to FIG. 10. As shown, the second embodiment is provided with comparators 90(1)–90(y) and a priority encoder 92, except for which the second embodiment is substantially identical to the first embodiment. According to the second embodiment, it is no longer required, before implementing the data insertion into the frame table 20, for the scheduler 44 to successively check the data stored in all the register units RU1–RUy in order to ascertain the register unit(s) to which the mobile terminal related to the new channel defining data is also assigned.

The comparators 90(1)–90(y) are respectively provided such as to receive first inputs from the register units RU1–RUy and a second input from the scheduler 44. Each of the first and second inputs represents the information which indicates "the mobile terminal ID" and "whether the data stored in the register unit is the downlink or uplink data".

The priority encoder 92 receives the comparison results from the comparators 90(1)–90(y). In the case where one comparison result indicates the coincidence between the first and second inputs, the priority encoder 92 is able to know the corresponding register unit from the comparison result, and issues a coded data specifying the register unit number at an output line 94. In this case, it is possible to modify the operation of the priority encoder 92 such as to issue a coded data after adding +1 to the register unit number which the priority encoder 92 has specified.

On the other hand, in the case the comparison results indicate that two or more neighboring (viz., adjacent) register units are detected which are assigned to an identical mobile terminal, the priority encoder 92 selects one register unit whose position number is the oldest. Further, if all the comparison results indicate no-hit (non-coincidence), then the priority encoder 92 issues data to that effect at an output 96. The priority encoder 92 applies the outputs thereof to the scheduler 44 which in turn carries out the inserting operations of the new channel defining data as mentioned above depending on the contents of the data received. However, the present invention is not limited to the above, and may be modified so that the priority encoder 92 generates a code representing the youngest register number among the neighboring register units. Further, it is possible to modify the operation of the priority encoder 92 such as to issue a coded data after adding +1 to the above-mentioned oldest register number.

In the descriptions thus far given, the present invention is applied to a high data rate radio access system. However, the present invention is applicable to the scheduling in the data communication through wire. Further, although the dynamic TDMA is based on TDMA/TDD (Time Division Duplex), the present invention can be applied to the scheduling of the downlink or uplink data. Accordingly, the present invention is applicable to the scheduling of the downlink or uplink data in FDD (Frequency Division Duplex) system.

The foregoing descriptions show two preferred embodiments and some modifications thereof. However, other various modifications are apparent to those skilled in the art without departing from the scope of the present invention which is only limited by the appended claims. Therefore, the embodiments and modification shown and described are only illustrated, not restrictive.

What is claimed is:

1. A hardware arrangement for scheduling channel allocation in a dynamic TDMA frame for communications with a plurality of terminals and reflecting the scheduling results in a frame table, comprising:
    a shift register being used as the frame table, said shift register comprising a plurality of register units coupled in tandem, each of said register units being allocable to a channel for one of said plurality of terminals; and
    a shift controller being coupled to said shift register, said shift controller controlling said shift register such as to write a new channel defining data into a given register unit and collectively shift a plurality of channel defining data respectively stored in a plurality of register units so as to make space for said new channel defining data at said given register unit.

2. The hardware arrangement as claimed in claim 1, wherein the communications are established wirelessly between an access point incorporating said hardware arrangement and said plurality of terminals.

3. The hardware arrangement as claimed in claim 1, wherein said given register unit is arranged in said shift register such as to be adjacent to a register unit wherein an identical terminal is assigned to said given register unit and said register unit.

4. The hardware arrangement as claimed in claim 1, further comprising means for determining said given register unit by comparing the data stored in each of said register units with data applied to said means.

5. The hardware arrangement as claimed in claim 4, wherein said means comprises a plurality of comparators which are arranged such as to respectively receive the data stored in said register units and the data applied to said means, said given register unit being determined using the outputs of said plurality of comparators.

6. The hardware arrangement as claimed in claim 5, wherein said means further comprises a priority encoder which is arranged such as to receive the outputs of said plurality of comparators, said priority encoder selecting one of register units according to a predetermined order of priority in the case where two or more register units are determined as being assigned to an identical terminal.

7. A method of scheduling channel allocation in a dynamic TDMA frame for communications with a plurality of terminals and reflecting the scheduling results in a frame table, comprising the steps of:
    determining a given register unit among a plurality of register units which are coupled in tandem and are used as the frame table, each of said plurality of register units being allocable to a channel for one of said plurality of terminals; and
    writing a new channel defining data into said given register unit and collectively shifting a plurality of channel defining data respectively stored in a plurality of register units so as to make space for said new channel defining data at said given register unit.

8. The method as claimed in claim 7, wherein said given register unit is arranged such as to be adjacent to a register unit wherein an identical terminal is assigned to said given register unit and said register unit.

9. The method as claimed in claim 7, wherein said given register unit is determined using means for comparing the data stored in each of said register units with data applied to said means.

10. The method as claimed in claim 9, wherein said means comprises a plurality of comparators which are arranged such as to respectively receive the data stored in said register units and the data applied to said means, said given register unit being determined using the outputs of said plurality of comparators.

11. The method as claimed in claim 10, wherein said means further comprises a priority encoder which is arranged such as to receive the outputs of said plurality of comparators, said priority encoder selecting one of register units according to a predetermined order of priority in the case where two or more register units are determined as being assigned to an identical terminal.

* * * * *